US007930760B2

(12) United States Patent
Coles et al.

(10) Patent No.: US 7,930,760 B2
(45) Date of Patent: Apr. 19, 2011

(54) CENTRALIZED ENFORCEMENT OF NAME-BASED COMPUTER SYSTEM SECURITY RULES

(75) Inventors: Neil Coles, Redmond, WA (US); Yadhu Gopalan, Issaquah, WA (US); Christopher Jordan, Redmond, WA (US); Matthew Lyons, Palatine, IL (US); Andrew Rogers, Redmond, WA (US); Upender Sandadi, Issaquah, WA (US); Scott Shell, Kirkland, WA (US); Zoheb Vacheri, Redmond, WA (US); Angelo Vals, Redmond, WA (US); Sharath Viswanathan, Redmond, WA (US); Loren M. Kohnfelder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 12/163,372

(22) Filed: Jun. 27, 2008

(65) Prior Publication Data
US 2009/0249436 A1 Oct. 1, 2009

Related U.S. Application Data

(60) Provisional application No. 61/041,425, filed on Apr. 1, 2008.

(51) Int. Cl.
*G06F 21/00* (2006.01)
*G06F 21/22* (2006.01)
(52) U.S. Cl. ............... 726/27; 726/28; 726/29
(58) Field of Classification Search .......... 726/22, 726/26, 27, 28, 29; 713/193, 182, 165
See application file for complete search history.

(56) References Cited

U.S. PATENT DOCUMENTS

| | | | |
|---|---|---|---|
| 6,453,419 B1 | 9/2002 | Flint |
| 6,490,624 B1 | 12/2002 | Sampson |
| 6,766,314 B2 | 7/2004 | Burnett |
| 6,820,082 B1 | 11/2004 | Cook |
| 7,174,563 B1 | 2/2007 | Brownlie |
| 7,185,357 B1 | 2/2007 | Wong |
| 7,260,718 B2 | 8/2007 | Burnett |
| 7,272,625 B1 | 9/2007 | Hannel |
| 7,318,237 B2 | 1/2008 | Moriconi |
| 2006/0085837 A1 | 4/2006 | Pesati |
| 2007/0050711 A1 | 3/2007 | Walker |
| 2007/0214144 A1 | 9/2007 | Lawson |
| 2007/0300297 A1 | 12/2007 | Dawson |

OTHER PUBLICATIONS

International Search Report and Written Opinion for PCT/US2009/035297, mailed Dec. 30, 2009, 10 pages.
"AppArmor Geeks", accessed at: http://en.opensuse.org/AppArmor_Geeks, accessed on Jan. 24, 2008, 10 pages.
Sirer et al.; "Distributed Virtual Machines: A System Architecture for Network Computing", accessed at: http://www.cs.cornell.edu/People/egs/papers/kimera-tr98-09-01.pdf, accessed on Jan. 23, 2008, 13 pages.
Spencer et al.; "The Flask Security Architecture: System Support for Diverse Security Policies", accessed at: http://www.cs.cmu.edu/~dga/papers/flask-usenixsec99.pdf, accessed on Jan. 23, 2008, 17 pages.

*Primary Examiner* — Jung Kim
*Assistant Examiner* — Izunna Okeke
(74) *Attorney, Agent, or Firm* — Merchant & Gould P.C.

(57) ABSTRACT

This disclosure describes techniques of using a centralized rule database to control the abilities of software processes to perform actions with regard to resources provided by a computer. As described herein, each software process executing in a computer executes within a chamber and each resource provided by the computer is associated with a canonical name that uniquely identifies the resource. Furthermore, the computer stores a set of security rules in a centralized rule database. In addition, this disclosure describes techniques of enforcing the rules stored in the centralized rule database.

20 Claims, 5 Drawing Sheets

CENTRALIZED ENFORCEMENT OF NAME-BASED COMPUTER SYSTEM SECURITY RULES

This application claims the benefit of U.S. Provisional Application No. 61/041,425, filed Apr. 1, 2008, the entire content of which is hereby incorporated by reference.

BACKGROUND

The arrival of Internet has ushered in an era in which computer security is of great importance. Because computers can now easily communicate, computer users can now unwittingly download and install software applications that, when executed as software processes, maliciously steal or destroy sensitive information or otherwise cause computers to behave in unexpected and undesirable ways. For instance, a software application embedded in an innocuous email attachment may, when clicked on by a user of a computer, launch a software process that sends credit card information stored on the computer to another computer. Accordingly, various computer security techniques have been developed to control the ability of software processes executing on a computer to perform actions with regard to other resources provided by the computer.

In one such technique, each sensitive resource provided by a computer is associated with an access control list. The access control list associated with a resource specifies users who are allowed to perform actions with regard to the resource. For instance, an access control list associated with a file that contains a credit card number may specify that processes associated with a user named "Harry" are allowed to read the file and may specify that processes associated a user named "Tom" are not allowed to read the file.

In another such technique, a computer stores capability lists associated with each user of the computer. The capability list associated with a user lists which sensitive resources the user is allowed to access. For instance, a capability list associated with a user named "Robert" may specify that processes initiated by "Robert" are allowed to communicate on the Internet and that processes initiated by "Robert" are allowed to read a file that contains a credit card number.

SUMMARY

This disclosure describes techniques of using a centralized rule database to control the abilities of software processes to perform actions with regard to resources provided by a computer. As described herein, each software process executing in a computer executes within a chamber and each resource provided by the computer is associated with a canonical name that uniquely identifies the resource. Furthermore, the computer stores a set of security rules in a centralized rule database. In addition, this disclosure describes techniques of enforcing the rules stored in the centralized rule database.

The techniques of this disclosure may be conceptualized in a variety of ways. For example, the techniques of this disclosure may be conceptualized as a method that comprises storing a set of rules in a centralized rule database, each rule specifying a set of actions that a subject account has a right to perform with regard to protected resources having canonical names described by a resource name pattern. In addition, the method comprises associating each software process of a device with a chamber in a plurality of chambers, wherein none of the software processes are associated with more than one of the chambers. Each chamber in the plurality of chambers is associated with at least one of the software processes. The method also comprises providing a set of service providers that performs an action with regard to one of the protected resources in response to a request from one of the software processes when the centralized rule database includes a rule that grants to an account associated with the chamber associated with the software process a right to perform the action with regard to the one of the protected resources. For each of the software processes, the software process uses the service providers to perform actions on any of the protected resources that are not associated with the software process. Furthermore, the method comprises receiving, with a target service provider that is one of the service providers, a request from a requesting software process that is one of the software processes. The method also comprises performing, with the target service provider in response to the request, an action with regard to a target resource when the centralized rule database includes a rule that grants to a subject account a right to perform the action with regard to the target resource, wherein the target resource is one of the protected resources, wherein the subject account is an account associated with the chamber associated with the requesting software process.

In another example, the techniques of this disclosure may be conceptualized as a device that comprises a plurality of protected resources, each of which is associated with a distinct canonical name. The device also comprises a centralized rule database that stores a set of rules, each rule specifying a set of actions that a subject account has a right to perform with regard to ones of the protected resources having canonical names described by a resource name pattern. In addition, the device comprises a set of software processes that includes each software process of the device. Each of the software processes is associated with a chamber in the plurality of chambers and each of the chambers is associated with at least one of the software processes. Furthermore, the device comprises a security infrastructure that, for any of the software processes associated with any of the chambers, prevents the software process from directly or indirectly performing an action on any of the protected resources that are outside the chamber, except when one of the rules in the centralized rule database grants to a subject account a right to perform the action on a target resource. The target resource is one of the protected resources that is not associated with the chamber. The subject account is an account associated with the chamber.

In another example, the techniques of this disclosure may be conceptualized as a computer-readable medium comprising instructions that, when executed by a computer, cause the computer to extract a set of rules from a document that contains extensible markup language (XML) elements, one or more of which represents one of the rules. Each of the rules includes: 1) a resource name attribute that specifies a resource name pattern that describes Internationalized Resource Identifiers (IRIs) that identify protected resources of the device, 2) a speaker attribute that specifies an account identifier that identifies an account associated with a process that created the rule; and 3) a priority attribute that specifies a priority of the rule. A first subset of the rules also include an authorize property that includes one or more delegation match attributes, wherein each match attribute of a rule in the first subset of the rules includes: 1) a delegate account identifier attribute that specifies an account identifier; and 2) a delegation action attribute that specifies a set of actions. A second subset of the rules also includes a delegation property that includes one or more match attributes, wherein each match attribute of a rule in the first subset of the rules includes: 1) an account identifier attribute that specifies an account identifier; and 2) an action attribute that specifies a set of actions. The instructions also cause the device to store the set of rules in a centralized database. In addition, the instructions cause the device to generate, for each software process of the device, an access token that specifies a chamber in a plurality of chambers, wherein none of the software processes are associated with more than one of the chambers, wherein each chamber in the plurality of chambers is associated with at least one of the software processes. The instructions also cause the device to provide a set of service providers that only perform an action with regard to one of the protected resources in response to a request from one of the software processes when the centralized rule database includes a rule that grants to an account associated with the chamber associated with the software process a right to perform the action with regard to the one of the protected resources. For each of the software processes, the software process must use the service providers to perform actions on any of the protected resources that are not associated with the software process. In addition, the instructions cause the device to launch a client process. The instructions also cause the device to invoke, with the requesting process, a method of a software interface implemented by a target server provider that is one of the service providers. Furthermore, the instructions cause the device to invoke, with the method of the target service provider after the method of the target service provider is invoked, a rule check method implemented by a rule enforcement engine that is part of a trusted computing base of the device, specifying a canonical resource name of a target resource that is one of the protected resources as a resource name parameter of the rule check method, specifying the access token for the requesting process as a subject parameter of the rule check method, and specifying a set of at least one right as a rights requested parameter of the rule check method. In addition, the instructions cause the device to invoke, with the rule check method after the rule check method is invoked, a query method implemented by a database service provider that is part of the trusted computing base of the device, specifying a trusted computing base account as a speaker parameter of the query method, specifying the resource name specified by the resource name parameter of the rule check method as a resource name parameter of the query method, and specifying the access token specified by the subject parameter of the rule check method as a subject parameter of the query method. The instructions also cause the device to initialize, with the query method when the query method is invoked, a priority variable to indicate a lowest priority, a rights granted variable to an empty set of rights, a stop processing flag to false. Furthermore, the instructions cause the device to identify, with the query method after the priority variable is initialized, a matching rule set that includes all rules in the centralized database that include a speaker attribute that specifies the trusted computing base account and that include a resource name attribute that specifies a resource name pattern that describes the resource name specified by the resource name parameter of the query method. The instructions also cause the device to (1) identify, with the query method after identifying the matching rule set, a current rule set that includes all rules in the matching rule set that include a priority attribute that specifies a priority equal to a priority specified by the priority variable. In addition, for each of the rules in the current rule set, the instructions cause the device to (2):

determine whether the rule in the current rule set includes an authorization property;

set the rights granted variable equal to a union of rights previously specified by the rights granted variable and a set of rights specified by the action attribute of the rule in the current rule set;

determine whether the rule in the current rule set includes a delegation property and whether the speaker parameter specifies an account identifier of a trusted computing base account of the device;

recursively invoke, when it is determined that the rule in the current rule set includes a delegation property and that the speaker parameter specifies the account identifier of the trusted computing base account of the device, the query method of the database service provider, providing the account identifier specified by the speaker attribute of the rule in the current rule set as a speaker parameter of the recursively invoked query method, providing the resource name of resource name parameter of the query method as a resource name parameter of the recursively invoked query method, and providing the access token specified by the subject parameter of the query method as a subject parameter of the recursively invoked query method;

receive, in response to recursively invoking the query method, a set of rights;

set the rights granted variable equal to a union of rights previously specified by the rights granted variable and the set of rights received in response to recursively invoking the query method;

determine whether the rule in the current set of rules includes a stop attribute;

determine, when it is determined that the rule in the current set of rules includes the stop attribute, whether the stop attribute is applicable to the account associated with the chamber specified by the access token specified by the subject parameter;

set, when it is determined that the stop attribute is applicable to the account associated with the chamber specified by the access token specified by the subject parameter, the stop processing flag to true.

The instructions also cause the device to (3) increment, after processing each rule in the current rule set, the priority variable. Moreover, the instructions cause the device to (4) determine, after the priority variable is incremented, whether the priority variable exceeds a maximum priority level. Furthermore, the instructions cause the device to (5) set, when it is determined that the priority variable exceeds the maximum priority level, the stop processing flag to true. The instructions also cause the device to (6) determine, when it is determined that the priority variable exceeds the maximum priority level or after the stop processing flag is set to true, whether the stop processing flag is set to true. In addition, the instructions cause the device to (7) return, when it is determined that the stop processing flag is set to true, the rights granted variable. The instructions also cause the device to (8) repeat, when it is determined that the stop processing flag is not set to true, actions 1-8. Moreover, the instructions cause the device to determine, at the rule check method when the rule check method receives the rights granted variable from the query method, whether the rights granted variable indicates a set of rights that are a subset of the rights specified by the rights requested parameter of the rule check method. The instructions also cause the device to return to the method of the target service provider a value. The value indicates that the account associated with the chamber specified by the access token of the requesting process has a right to perform the action specified by the rights requested parameter of the rule check method when the rights granted variable indicates a set of rights that are a subset of the rights specified by the rights requested parameter of the rule check method. The value indicates that the account associated with the chamber specified by the access token of the requesting process does not have a right to perform the action specified by the rights requested parameter of the rule check method when the rights granted variable indicates a set of rights that are not a subset of the rights specified by the rights requested parameter of the rule check method. The instructions also cause the device to determine, at the method of the target service provider, whether the value indicates that the account associated with the chamber specified by the access token of the requesting process has a right to perform the action specified by the rights requested parameter of the rule check method. In addition, the instructions cause the device to perform, at the method of the target service provider when it is determined that the value indicates that the account associated with the chamber specified by the access token of the requesting process has a right to perform the action specified by the rights requested parameter of the rule check method, the action on the resource. Furthermore, the instructions cause the device to return, at the method of the target service provider when it is determined that the value indicates that the account associated with the chamber specified by the access token of the requesting process does not have a right to perform the action specified by the rights requested parameter of the rule check method, an error to the client process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
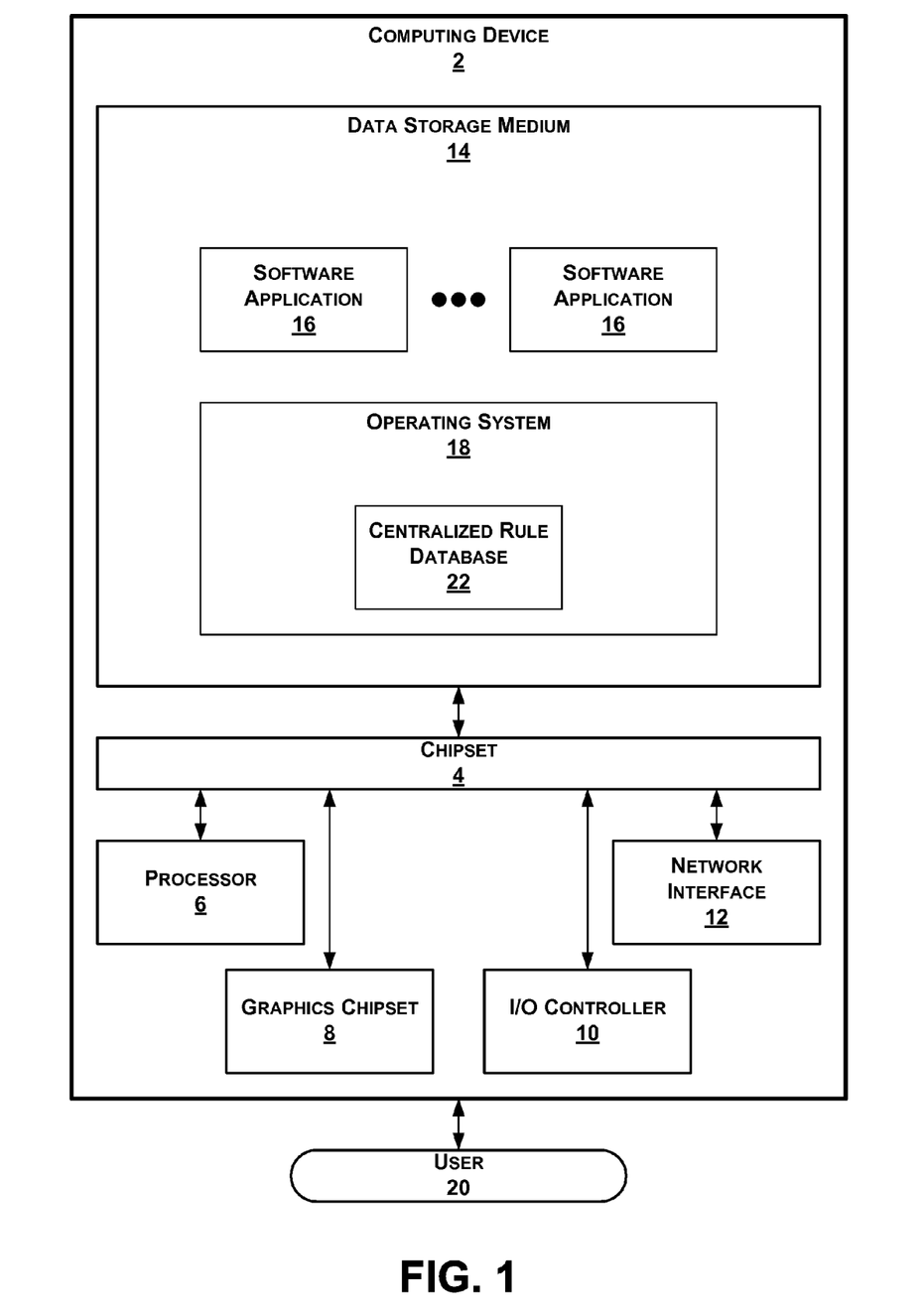
FIG. 1 is a block diagram illustrating an example device that uses centralized enforcement of name-based computer system security rules.

FIG. 1 is a block diagram illustrating an example device 2 that uses centralized enforcement of name-based computer system security rules. It should be appreciated that FIG. 1 is provided for explanatory purposes only and is not intended to represent a sole way of implementing the techniques of this disclosure. Rather, the techniques of this disclosure may be implemented in many other ways.

Device 2 may be a wide variety of different types of devices. For instance, device 2 may be a handheld computing device such as a mobile telephone, a tablet computer, a smart phone, a personal digital assistant, a personal media player, a portable gaming system, or another type of handheld computing device. In another instance, device 2 may be a personal computer, a laptop computer, a computer kiosk, a server, an intermediate network device, a network appliance, a server blade, a telephone, a television set top box, a game console, an electronic gambling device, a mainframe computer, a specialized scientific computer, or another type of computing device. In a third instance, device 2 may be a device integrated into a vehicle (including manned and autonomous civilian and military vehicles, trucks, trains, watercraft, aircraft, spacecraft, and other types of vehicles).

As illustrated in the example of FIG. 1, device 2 includes a chipset 4 that facilitates data communication between a processor 6, a graphics chipset 8, an Input/Output (I/O) controller 10, a network interface 12, and a data storage medium 14. Chipset 4 may be many different types of chipsets. For instance, chipset 4 may be a chipset in the Advanced Micro Devices 700 chipset series manufactured by Advanced Micro Devices of Sunnyvale, Calif., a chipset in the nForce 700 chipset series by Nvidia Corporation of Santa Clara, Calif., or another type of chipset. Chipset 4 may exchange information with processor 6, graphics chipset 8, I/O controller 10, networking interface 12, and data storage medium 14 using a variety of different types of buses and/or interconnects. For instance, chipset 4 may use a PCI Express interconnect to exchange data with graphics chipset 8 and may use a Low Pin Count (LPC) bus to exchange data with I/O controller 10.

It should be appreciated that device 2 may include many other components in addition to processor 6, graphics chipset 8, I/O controller 10, network interface 12, and data storage medium 14. For instance, device 2 includes a power distribution system that is not illustrated in the example of FIG. 1. Furthermore, it should be appreciated that in other instances, devices implementing the techniques of this disclosure may not include all of the components illustrated in the example of FIG. 1. For instance, a device that implements the techniques of this invention might not include a network interface, a graphics chipset, and/or an I/O controller.

Data storage medium 14 represents a logical collection of one or more volatile and/or non-volatile data storage media that are capable of storing data, including software instructions and application data. For instance, data storage medium 34 may represent one or more magnetic disks, optical discs, flash memory units, dynamic random access memory (RAM) units, RamBus RAM units, synchronous dynamic RAM units, or other types of data storage media.

Processor 6 is an integrated circuit that is capable of executing instructions. For example, processor 6 may be a microprocessor, an application-specific integrated circuit, a digital signal processor, a graphics processing unit, or another type of integrated circuit that is capable of executing instructions. For instance, processor 6 may be a Core processor manufactured by Intel Corporation of Santa Clara, Calif., or a K10 processor manufactured by Advanced Micro Devices, Inc. of Sunnyvale, Calif. Although not illustrated in the example of FIG. 1, device 2 may include several such processors. Processor 6 may read data stored in data storage medium 14 by retrieving the data via chipset 4. Moreover, processor 6 may write data to data storage medium 6 by sending the data to data storage medium 14 via chipset 4.

Network interface 12 enables device 2 to send data on a network and to receive data from the network. For instance, network interface 12 may be an Ethernet network interface, a token ring network interface, a fiber optic network interface, a WiFi network interface, a WiMax network interface, or another type of wired or wireless network interface. When network interface 12 receives data from the network, network interface 12 may store the data in data storage medium 14 by sending the data to data storage medium 14 via chipset 4. Furthermore, processor 6 may send data via chipset 4 to network interface 12 for transmission on the network.

Graphics chipset 8 may be one or more integrated circuits that render graphics for output on a display device. For instance, graphics chipset 8 may perform 2-dimensional and 3-dimensional graphics operations in response to requests from processor 6.

I/O controller 10 enables device 2 to receive input from peripheral input devices such as keyboards, mice, trackballs, touch-sensitive screens, microphones, and other peripheral input devices. In addition, I/O controller 10 may enable input from and output to devices attached to device 2 via Universal Serial Bus (USB) ports, serial buses, parallel buses, and other types of devices.

As illustrated in the example of FIG. 1, data storage medium 14 stores software applications 16A-16N (collectively, software applications 16). Software applications 16 may be a wide variety of different types of software applications. For instance, software applications 16 may be word-processing applications, spreadsheet applications, multimedia applications, game applications, network browser applications, computer virus applications, spyware applications, or other types of legitimate or malicious software applications. When executed by processor 6, software applications 14 become one or more software processes. In other words, when processor 6 executes instructions in any of software applications 14, the instructions may cause processor 6 to manage one or more "software processes."

As illustrated in the example of FIG. 1, data storage medium 14 stores an operating system 18. For example, operating system 18 may be a Microsoft VISTA® operating system, a Microsoft Windows XP operating system, a Microsoft Windows CE operating system, a Windows Server® operating system, a Linux operating system, an Apple Macintosh operating system, or another type of operating system. When executed by processor 6, operating system 18 manages the sharing of the resources of device 2. For example, operating system 18 controls and allocates random access memory, manages a file system, sends and receives data via a network, manages creation and termination of software processes, manages prioritization of software processes, manages software process context switching, manages thread context switch, manages virtual memory, manages inter-process communication, manages a registry, and so on. Furthermore, operating system 18 provides software interfaces that enable software processes to access resources of device 2. For example, operating system 18 may provide a software interface that enables software processes to read data from and write data to files in the file system, a software interface that enables software processes to create other software processes, a software interface that enables software processes to receive data from and send data to a network, and so on.

When device 2 starts up, device 2 automatically begins executing operating system 18. After launching, but before operating system 18 allows any user-mode processes to begin executing, operating system 18 may require a user 20 of device 2 to log in. For example, operating system 18 may require user 20 to provide a username and password and may log in user 20 when user 20 provides a password that corresponds to the entered username. After user 20 logs in, operating system 18 may automatically launch one or more of software applications 16. In addition, after user 20 logs in, user 20 may instruct operating system 18 to launch one or more of software applications 16.

As described in detail below, when operating system 18 launches one of software applications 16, operating system 18 may create an access token associated the resulting software process. The access token of the software process identifies a chamber within which the software process executes. As used in this disclosure, a "chamber" is a virtual execution environment. A chamber is a virtual execution environment in the sense that a software process executing in the chamber can interact with resources within the chamber, but cannot interact with resources in other chambers, except when granted the right to do so. For example, a first software process operating in a first chamber cannot interact with a second software process operating in a second chamber, but the first software process and the second software process can interact with a common set of lower-level resources. In some circumstances, a software process operating in a first chamber can use a lower-level resource to communicate with a software process operating in a second chamber.

Each chamber is associated with an account or a group of accounts recognized by device 2. Each account is associated with a unique name. In other words, in the example shown, no two accounts recognized by device 2 can have the same name.

Device 2 may recognize several different types of accounts. For example, device 2 may recognize accounts associated with individual people, accounts associated with supervisors, and an account associated with a Trusted Computing Base (TCB). An account associated with an individual person may have limited rights to perform actions on resources. A supervisor account is an account that has greater rights than a user account. The TCB account is a special account that has unlimited rights to all resources of device 2. Processes in the TCB of device 2 are only permitted to operate in a chamber associated with the TCB account.

As described in detail below, each resource of device 2 is associated with a canonical name. In the example shown, no two resources of device 2 can have the same canonical name. In one implementation, the canonical names of resources are Internationalized Resource Identifiers (IRIs) as defined in Internet Engineering Task Force (IETF) Request For Comment (RFC) 3987. An IRI is a sequence of characters from the Universal Character Set (Unicode/ISO 10646) that identifies a resource. For example, the canonical name of a file in a file system may be "Management://file/Documents and Settings/Smith/My Documents/bookreport.doc". In another example, the canonical name of a fax service may be "Management://Windows/System32/Fax". Slash characters (i.e., "/") divide canonical names of resources into path segments. For instance, in the previous example, "Window," "System32," and "Fax" are each path segments.

A centralized rule database 22 maintained by operating system 18 stores rules, each of which specifies one or more actions that a software process associated with an account or group of accounts is permitted to perform on one or more resources. For instance, each rule stored in centralized rule database 22 includes an account portion, an action portion, and a resource name pattern portion. In this instance, the account portion of a rule is a string that identifies an account or group of accounts. The action portion of a rule is a string that describes a particular type of action. These actions may include "read," "write," "execute," and/or other types of actions. The resource name pattern portion of a rule is a string that describes a set of canonical names of resources. For example, "Management://Windows/System32/Fax" is a resource name pattern that describes the canonical name of a single resource.

Resource name patterns may include wildcard characters. In one example implementation, resource name patterns may include "*" wildcard characters and/or "+" wildcard characters. In this implementation, the "*" wildcard character represents one or more path segments and is only valid as the last path segment of a resource name pattern. For example, "Management://Windows/System32/*" is a resource name pattern that describes all canonical names that begin with the string "Management://Windows/System32/". In this example, "Management://Windows/System32/Fax" and "Management://Windows/System32/TCP" are canonical names of resources that begin with the string "Management://Windows/System32/". Furthermore, in this implementation, the "+" wildcard character represents any one path segment and may be used in place of any path segment in a resource name pattern. For example, "Management://dms/+/ext" is a resource name pattern that describes all canonical names that begin with the string "Management://dms/", specify any single path segment, and end with the string "ext". In this example, "Management://dms/ABC/ext" and "Management://dms/XYZ/ext" are canonical names of hypothetical resources described by the resource name pattern "Management://dms/+/ext".

When a software process executing in a chamber associated with a specific account wants to perform an action that requires the use of a particular resource, the software process may invoke a method of a software interface provided by operating system 18. For example, when the software process wants to read information from a particular file, the software process may invoke a hypothetical "read(String filename)" method provided by operating system 18. When the software process invokes the method, operating system 18 automatically determines whether the invoked method is permitted to perform the requested action on behalf of the software process. Operating system 18 may determine whether the invoked method is permitted to perform the action on behalf of the software process by determining whether a rule in centralized rule database 22 grants to the account the right to perform the requested action with regard to the protected resource. If centralized rule database 22 contains such a rule, operating system 18 may permit the invoked method to perform the requested action on behalf of the software process. Otherwise, if centralized rule database 22 does not contain such a rule, operating system 18 does not permit the invoked method to perform the requested action on behalf of the software process.

Figure 2:
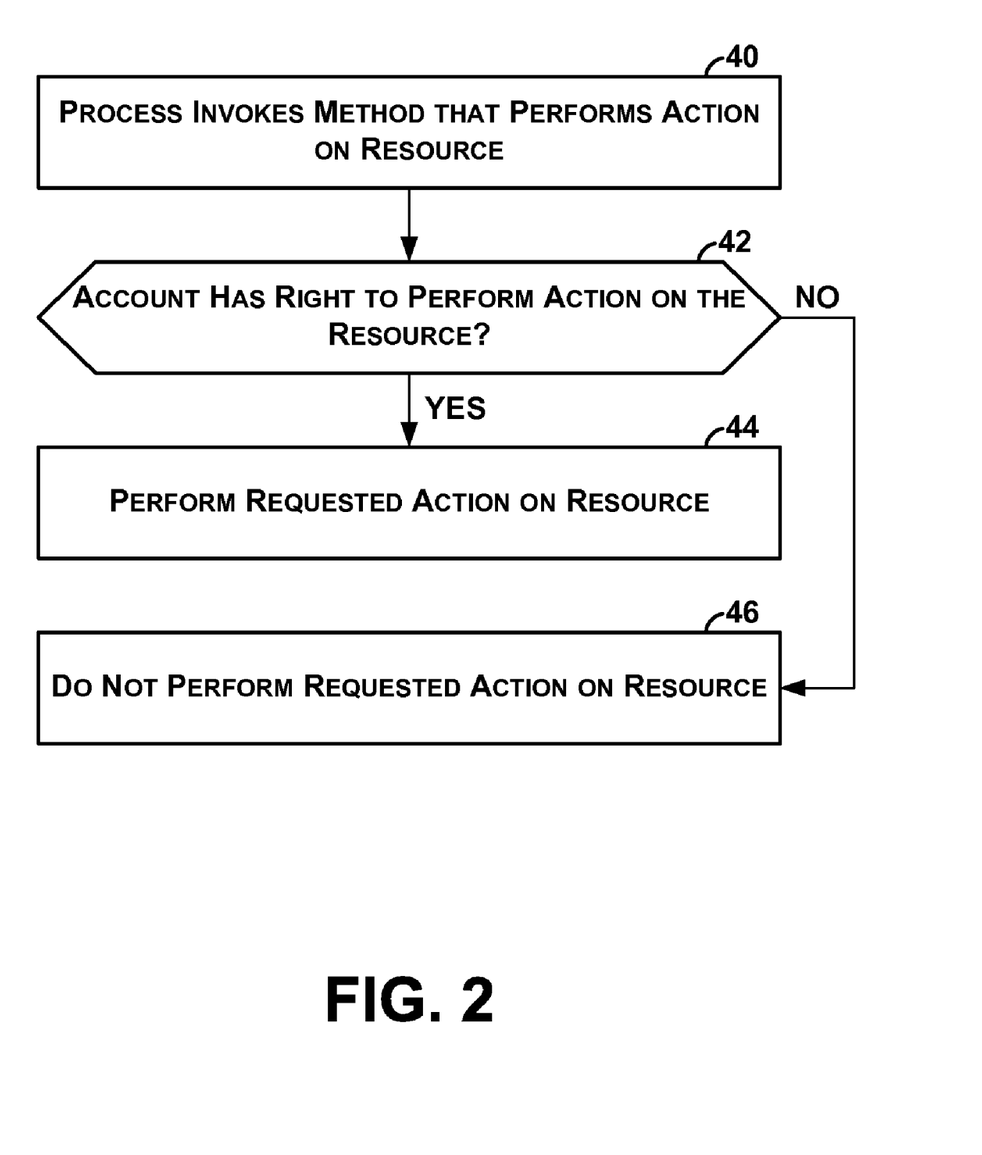
FIG. 2 is a flowchart illustrating an example operation of the device illustrated in the example of FIG. 1.

FIG. 2 is a flowchart illustrating an example operation of device 2. As illustrated in the example of FIG. 2, a software process executing in a chamber associated with an account invokes a method provided by operating system 18 (40). Execution of the method may require that the method perform an action on a protected resource. For example, execution of a hypothetical "writeToFile" method may require the method to write data to a particular file.

When the software process invokes the method, operating system 18 uses rules in centralized rule database 22 to determine whether the account has a right to perform the action on the protected resource (42). In the previous example, operating system 18 uses the rules in centralized rule database 22 to determine whether the account has a right to write to the particular file.

If the account has a right to perform the action on the protected resource ("YES" of 42), operating system 18 permits the invoked method to perform the action on the protected resource (44). In the previous example, when the account has a right to perform the action on the protected resource, operating system 18 permits the "writeToFile" method to write the data to the particular file.

On the other hand, if the account does not have a right to perform the action on the protected resource ("NO" of 42), operating system 18 does not permit the invoked method to perform the action on the protected resource (46). In the previous example, when the account does not have a right to perform the action on the protected resource, operating system 18 does not permit the "writeToFile" method to write the data to the particular file.

Figure 3:
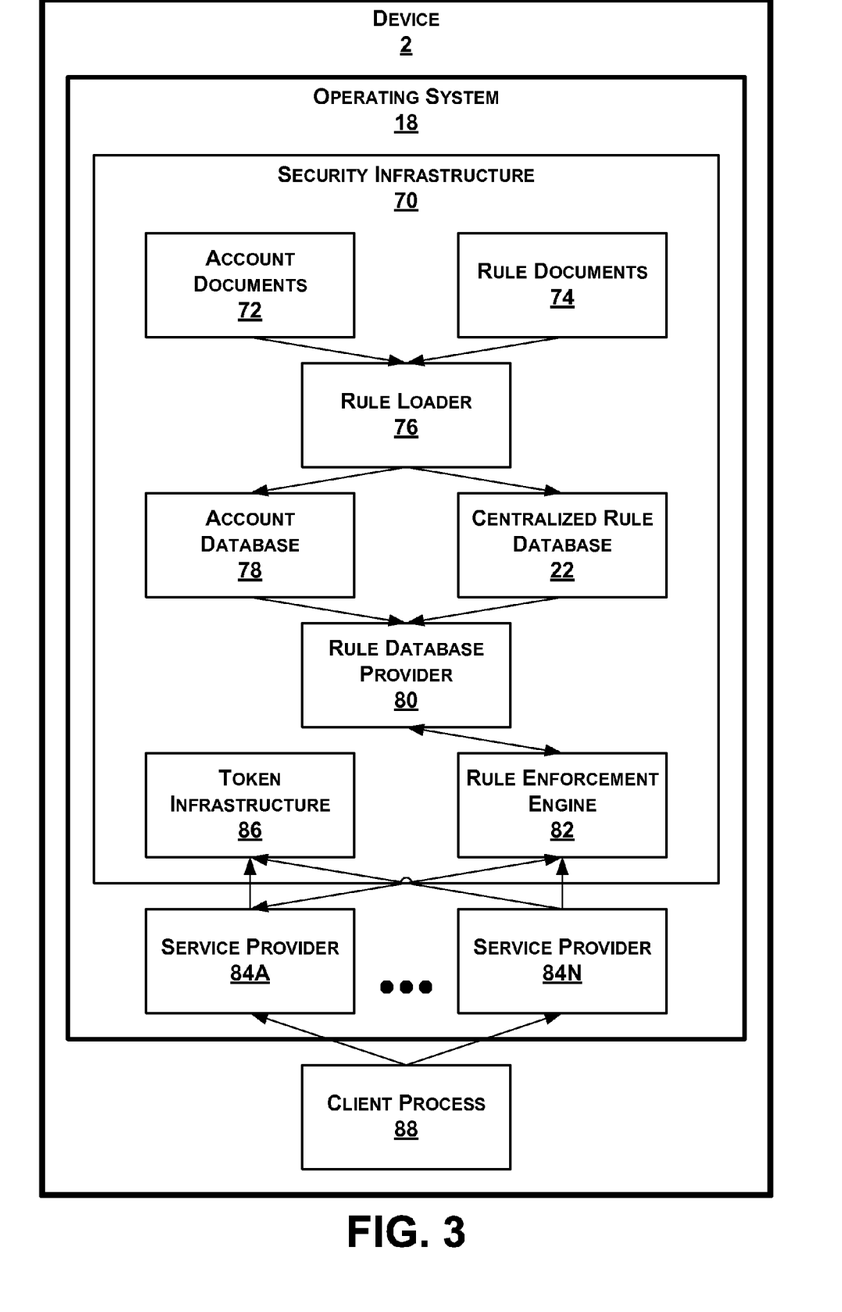
FIG. 3 is a block diagram illustrating an example software system present in the device of FIG. 1.

FIG. 3 is a block diagram illustrating an example software system present in device 2. The software system represents relationships among software processes executing on device 2, and other resources.

As illustrated in the example of FIG. 3, device 2 includes operating system 18 and operating system 18 includes a security infrastructure 70. Security infrastructure 70 prevents any process operating in a chamber from directly or indirectly performing an action on any protected resources that are outside the chamber, except when one of the rules in the centralized rule database explicitly grants to the account associated with the chamber a right to perform the action on one of the protected resources that is outside the chamber. Security infrastructure 70 may be part of a trusted computing base of device 2. The trusted computing base of device 2 is the software in device 2 that is considered vital to the security of device 2.

Furthermore in the example of FIG. 3, security infrastructure includes a set of one or more account documents 72. Account documents 72 are files that define "accounts." As used in this disclosure, an account is a logical group of one or more users. Each account is associated with an account identifier that is usable in rules. For example, one of account documents 72 may include the following Extensible Markup Language (XML) element that defines an account:

```
<Account
   Id="Supervisor_Account"
   FriendlyName="Windows Mobile System Account"
   Action="CreateNew"
   Description="Local System"
   Type="User">
      <MemberOfGroup Action="Add"
         GroupAccountID="$(SYSTEM_GROUP_NAME)"/>
      <MemberOfGroup Action="Add"
         GroupAccountID="$(SUPERVISOR_GROUP_NAME)"/>
</Account>
```

In this example, the account is associated with the account identifier "Supervisor_Account". Furthermore, the account in this example is associated with two groups: "$ (SELF_ISOLATED_GROUP_NAME)" and "$ (SUPERVISOR_GROUP_NAME)". In this example, the "$" sign in these group names may indicate that these group names are in fact macros that are standing in for one or more real group identifiers.

Furthermore, in the example of FIG. 3, security infrastructure 70 includes a set of rule documents 74. Rule documents 74 are files that contain rules. In one implementation, rule documents 74 may contain XML elements that represent the rules.

In one example implementation, each rule has a "resource name pattern" attribute, a "priority" attribute, and "speaker" attribute. The "resource name pattern" attribute of a rule specifies a resource name pattern that describes a set of canonical names of resources.

The "priority" of a rule specifies the priority category of the rule. Because the "resource name pattern" attributes of rules may specify resource name patterns that describe the canonical names of multiple resources, multiple rules may be applicable to a single resource. These rules may potentially contradict each other. For instance, a first rule may indicate that a particular account only has a right to read a particular resource and a second rule may indicate that the particular account only has a right to execute the particular resource. The priority categories specified by "priority" attributes of rules may help to resolve such conflicts by indicating which rule to apply when more than one rule is applicable.

The "speaker" attribute of a rule specifies an account identifier of a "speaker" of the rule. As used in this disclosure, an account that created a rule is the "speaker" of the rule. Rules may be created by a variety of different accounts. As a result, a rule created by a user associated with a low-level account could contradict a rule created by a user associated with a high-level account. For example, a senior information technology (IT) officer at a company may create rules in rule documents 74 and a junior IT officer may also create rules in rule documents 74. Consequently, the junior IT officer may inadvertently create a rule that contradicts a rule created by the senior IT officer. To prevent this result, each rule includes a "speaker" attribute that specifies an account identifier associated with a user who created the rule. As described below, when conflicting rules are evaluated, preference may be given to a rule that was created by a user with higher priority.

Furthermore, rules in centralized rule database 22 may include one or more "authorize" properties. Each "authorize" property of a rule includes one or more match properties. A match property of an "authorize" property indicates actions that accounts are authorized to (i.e., have a right to) perform with regard to resources having canonical names described by the resource name pattern specified by the "resource name pattern" attribute of the rule.

In one implementation, each match property has an "account identifier" attribute, an "action" attribute, and a "stop" attribute. The "account identifier" attribute of a "match" property specifies an account identifier that identifies an account or group of accounts. For example, the "account identifier" attribute of a "match" property may specify the account identifier "Supervisor_Group". The "action" attribute of a "match" property specifies one or more actions. For instance, the "action" attribute of a "match" property may specify the actions "READ" and "WRITE". The "stop" attribute of a "match" property specifies "true" or "false." When the "stop" attribute of the "match" property specifies "true," then no lower priority rule is permitted to grant a right to the account identified by the "account identifier" attribute of the "match" property to perform an action on a resource having a canonical name described by the resource name pattern specified by the "resource name pattern" attribute of the rule. On the other hand, if the "stop" attribute of the "match" property specifies "false", then a lower priority rule is permitted to grant a right to the account identified by the "account identifier" attribute of the "match" property to perform an action on a resource having a canonical name described by the "resource name pattern" specified by the resource name pattern attribute of the rule.

In this way, each "match" property of an "authorize" property of a rule indicates that a process in a chamber associated with an account identified by the "account identifier" attribute of the "authorize" property has a right to perform the action specified by the "action" attribute of the "authorize" property on resources having canonical names described by a resource name pattern specified by the "resource name pattern" attribute of the rule.

In an implementation in which rules are represented as XML elements, one of rule documents 74 may include the following rule element:

```
<Rule
    Description="Protect the connection manager directory"
    ResourceIRI="$(FILESYS_PRIMARY_ROOT)/CONNMGR/(*)"
    SpeakerAccountId="$(SYSTEM_USER_NAME)"
    PriorityCategoryId="PRIORITY_STANDARD">
    <Authorize>
        <Match
            AccountId="Supervisor_Group"
            Actions="ALL_ACCESS"
            Stop="false" />
        <Match
            AccountId="Normal_User_Group"
            Actions="READ, EXECUTE"
            Stop="true" />
    </Authorize>
</Rule>
```

In this example, the rule specifies that the "$(SYSTEM_USER_NAME)" account authorizes the "Supervisor_Group" account to make rules that grant to other accounts rights to perform any action regarding resources having canonical names described by the resource name pattern "$(FILESYS_PRIMARY_ROOT)/CONNMGR/(*)". The rule also specifies that the "$(SYSTEM_USER_NAME)" account authorizes the "Normal_User_Group" account group to make rules that grant to other accounts rights to perform read and execute actions regarding resources having canonical names described by the resource name pattern "$(FILESYS_PRIMARY_ROOT)/CONNMGR/(*)".

Rule documents 74 may include rules that include "delegation" properties. In general terms, a "delegation" property specifies that a specific account is allowed to create rules that govern the ability of processes in chambers associated with other accounts to perform actions on the resources covered by the rule. In one implementation, a "delegation" property of a rule indicates an account. Users associated with this account have the right to make rules that authorize other accounts to perform actions with regard to resources having canonical names described by the resource name pattern specified by the "resource name pattern" attribute of the rule. For example, a rule having a "speaker" attribute that specifies a trusted computing base (TCB) account may include a "delegation" property that indicates that a "supervisor" account is permitted to make rules that authorize other accounts to perform actions with regard to files in a particular directory of a file system.

In one implementation, "delegation" properties are formatted in rule documents 74 as XML properties of rule elements. For instance, one of rule documents 74 may include the following XML rule element:

```
<Rule
    Description="Protect the connection manager directory"
    ResourceIRI="$(FILESYS_PRIMARY_ROOT)/CONNMGR/(*)"
    SpeakerAccountId="SYSTEM/TCB"
    PriorityCategoryId="PRIORITY_STANDARD">
    <Delegation>
        <Match AccountId="Supervisor_Group" Actions="READ" />
</Rule>
```

In this example, the "Delegation" property includes a "Match" property that specifies that the account "System/TCB" has delegated the right to make rules regarding "READ" actions performed on resources having canonical names described by the resource name pattern "$ (FILESYS_PRIMARY_ROOT)/CONNMGR/(*)" to the account "Supervisor_Group".

Rules that include "delegation" properties may form chains of delegation rules. For example, a chain of delegation rules may include a first rule that indicates that a first account delegates a right to make rules regarding an action performed on certain resources to a second account. In this example, the chain of delegation rules may include a second rule that indicates that the second account delegates a right to make rules regarding the action performed one or more of the certain resource to a third account, and so on.

It should be appreciated that the rules may include other types of properties. For example, a rule may include a "call DLL" property that specifies that a particular dynamic link library (DLL) must be invoke to determine whether an account has a right to perform an action with regard to a particular resource.

As illustrated in the example of FIG. 3, security infrastructure 70 includes a rule loader 76. When security infrastructure 70 is initialized, rule loader 76 reads account documents 72 and loads the accounts stored in account documents 72 into an account database 78. In implementations in which the accounts are represented in account documents 72 as XML elements, the accounts may be accessed more quickly when the accounts are stored in account database 78 than when the accounts are represented as XML elements in account documents 72. In addition, rule loader 76 reads rule documents 74 and loads the rules stored in rule documents 74 into centralized rule database 22. In implementations in which the rules are represented in rule documents 74 as XML elements, the rules may be accessed more quickly when the rules are stored in centralized rule database 22 than when the rules are represented as XML elements in rule documents 74.

Account database 78 and centralized rule database 22 may be a variety of different types of databases. For instance, account database 78 and/or centralized rule database 22 may be relational databases, associative databases, files, file systems, Online Analytic Processing (OLAP) data cubes, object-oriented databases, hash tables, or other data storage structures. It should be appreciated that in some implementations, account database 78 and/or centralized rule database 22 may be regarded or implemented as a single database or as multiple databases.

Furthermore, as illustrated in the example of FIG. 3, security infrastructure 70 includes a rule database provider 80. Rule database provider 80 implements a software interface that includes one or more methods for querying centralized rule database 22 and account database 78. For example, rule database provider 80 may implement an access right query method that accepts a "speaker" parameter, a "resource name" parameter, and a "subject" parameter. In this example, the "speaker" parameter specifies an account identifier of a first account, the "resource name" parameter specifies a canonical name of a resource, and the "subject" parameter specifies an account identifier that identifies a second account. Furthermore, in this example, the access right query method returns a value that indicates rights to perform actions with regard to the resource that are granted to the second account by rules created by the first account. An example operation of rule database provider 80 to identify rights to perform actions with regard to the resource that are granted to the second account by rules created by the first account is provided below with regard to FIG. 5.

Furthermore, the software interface implemented by rule database provider 80 may include methods for querying account database 78. Other methods in the software interface implemented by rule database provider 80 may include one or more methods to write rules to centralized rule database 22, methods to write accounts to account database 78, and methods that provide other functionality.

Security infrastructure 70, in the example of FIG. 3, also includes a rule enforcement engine 82. Rule enforcement engine 82 implements a software interface that includes a rule check method. In one example implementation, the rule check method accepts an "access token" parameter, a "rights requested" parameter, and a "resource name" parameter. The "access token" parameter accepts an access token of a software process. The "rights requested" parameter accepts data that indicates a type of right. The "resource name" parameter indicates a resource of device 2.

When the rule check method is invoked, the rule check method may invoke a method of the software interface implemented by rule database provider 80 to identify an account associated with the chamber indicated by the access token specified by the "access token" parameter. After identifying the account associated with the chamber, the rule check method may invoke the access right query method of the software interface implemented by rule database provider 80 to identify rights provided by rules created under the authority of the TCB account to the identified account with regard to the resource indicated by the "resource name" parameter of the rule check method.

In response to invoking the access right query method implemented by rule database provider 80, the rule check method of rule enforcement engine 82 may receive a list of rights that specifies rights of processes operating a chamber associated with the identified account to perform actions with regard to the resource indicated by the "resource name" parameter of the rule check method. The rule check method of rule enforcement engine 82 may then determine whether the rights specified by the "rights requested" parameter of the rule check method are a subset of the rights specified by the list of rights returned by the access right query method of rule database provider 80. If the rule check method determines that the rights requested are a subset of the rights specified the list of rights, the rule check method may return to the caller of the rule check method a value that indicates that software processes operating in the chamber indicated by the access token have the right to perform the requested action on the requested resource. On the other hand, if the rule check method determines that the requested rights are not a subset of the rights specified in the list of rights, the rule check method may return to the caller of the rule check method a value that indicates that software processes in the chamber indicated by the access token do not have the right to perform the requested action on the requested resource.

In the example of FIG. 3, operating system 18 includes a set of service providers 84A-84N (collectively, "service providers 84"). Service providers 84 implement software interfaces that include methods that use protected resources of device 2. For example, one or more of service providers 84 may be system service providers that provide access to system services such as a file system, a registry, a user interface, and so on. In another example, service provider 84B may implement a software interface that enables other software processes to control a modem attached to device 2. In another example, one or more of service providers may provide services other than operating system services. Although not illustrated in the example of FIG. 3, one or more of service providers 84 may exist outside of operating system 18. Service providers 84 may operate in kernel-mode or in user-mode.

In addition, service providers 84 may include a process creation service provider. The process creation service provider implements a software interface that includes one or more methods that, when invoked, create a new software process. When the process creation service provider creates a new software process, the process creation service provider may interact with a token infrastructure 86 to create a new access token for the new software process. In one implementation, the new access token for the new software process contains the same information as an access token of a software process that invoked the method of the process creation service provider. Consequently, the new software process is not associated with an account that is afforded greater rights than an account that caused the new software process to be created. In other words, a software process may not elevate its rights by creating a new software process.

The software interface implemented by the process creation service provider may also include one or more methods that, when invoked, create a new software thread. The process creation service provider may similarly interact with token infrastructure 86 to create a new access token for the new software thread. The access token for the new software thread may include the same information as an access token of a software process or software thread that invoked the method of the process creation service provider.

Each of service providers 84 that implement a method that performs an action on a protected resource of device 2 invokes the rule check method of rule enforcement engine 82 prior to performing the action on the protected resource. In order to invoke the rule check method of rule enforcement engine 82, service providers 84 may first interact with token infrastructure 86 to retrieve an access token associated with a software process that invoked the method of the service provider. The method of the service provider may then use this access token as a parameter of the rule check method of rule enforcement engine 82.

One or more of service providers 84 may be responsible for managing resources of device 2. In some example implementations, protected resources are classified into a plurality of types of system services by service providers that manage the resources. In these implementations, the canonical names of the protected resources that are classified into different types belong to different hierarchical namespaces. For example, service provider 84A may be a file system manager that is responsible for managing files on a disk drive. In this example, the file system manager uses a hierarchical namespace to identify files on the disk drive. For instance, the file system manager may use the name "C:\Documents and Settings\hk\My Documents\Resume.doc" to identify a particular file on disk drive "C." In this example, the canonical name of the file may be "rule://Resources/File/C/Documents and Settings/hk/My Documents/Resume.doc" In a second example, service provider 84B may be a registry key manager that manages registry keys. In this second example, the registry key manager uses a hierarchical namespace to identify registry keys. In such implementations, these ones of service providers 84 may implement "canonicalizer" methods that translate names in the hierarchical namespaces into canonical names. Furthermore, in such implementations, these ones of service providers 84 may first use their canonicalizer methods to translate names in their hierarchical namespaces into canonical names. After using the canonicalizer methods to translate names in their hierarchical namespaces into canonical names. These ones of service providers 84 may then invoke the rule check method of rule enforcement engine 82 using the canonical names.

Other ones of service providers 84 may perform actions on system resources that are not identified using hierarchical namespaces. A system resource is a resource that is not specific to any account. For instance, system resources such as application programming interfaces (APIs), privileges, and system resources are generally not identified using hierarchical namespace. However, such system resources are typically associated with classes and sub-classes of objects. For example, each system API in Microsoft WINDOWS® operating systems has a distinct name. Because such system resources are typically associated with classes and sub-classes, canonical names can be identified for such system resources by substituting the class names and sub-class names into a standard format. For example, a canonical name can be identified for a system resource in a class "X" and a sub-class "Y" by substituting "X" and "Y" into the indicated places in the following format:

rule://Resources/System/$(Class)/$(Sub-Class)

In this example, the resulting canonical name of the system resource is:

rule://Resources/System/X/Y

Because canonical names can be identified for such system resources by simple substitution, the rule check method of rule enforcement engine 82 may accept class names and sub-class names of system resources in place of canonical names of resources.

Other ones of service providers 84 may perform actions on account-specific resources that are not identified using a hierarchical namespace. An account-specific resource is a resource that is specific to an account. Like system resources, account-specific resources are not necessarily identified using hierarchical namespaces. However, such account-specific resources are typically associated with classes and sub-ject-classes. For example, a debug process may be operating in a chamber associated with an account "Y". In this example, the debug process may be in a class of objects named "PROCESSES" and may be in a sub-class named "DEBUG". Because such account-specific resources are typically associated with classes and sub-classes, canonical names can be identified for such account-specific resources by substituting account names, class names, and sub-class names into a standard format. Continuing the previous example, a canonical name can be identified for the debug process by substituting the account identifier, the class name, and the sub-class name into the following format:

rule://Resources/$(AccountID)/$(Class)/$(Sub-Class)

In this example, the resulting canonical name of the account-specific debug resource is:

rule://Resources/Y/PROCESSES/DEBUG

Because canonical names can be identified for such account-specific resources by simple substitution, the rule check method of rule enforcement engine 82 may accept class names and sub-class names of account-specific resources in place of canonical names of resources.

In some implementations, token infrastructure 86 may provide a stack of access tokens to the service provider when the service provider requests the access token of the software process that invoked the method of the service provider. In these implementations, the access tokens in the stack of access tokens include the access tokens of each software process and/or service provider in a chain of method invocations. For example, if a software process "A" invokes a method implemented by a software process "B" and the method implemented by software process "B" invokes a method implemented by service provider 84A, the stack of access tokens may include the access token for software process "A" and the access token for software process "B". In a similar example, if a software process "A" invokes a method implemented by service provider 84A and the method implemented by service provider 84A invokes a method implemented by service provider 84B, the stack of access tokens returned by token infrastructure 86 to service provider 84B may include the access token associated with software process "A" and the access token associated with service provider 84A. When service providers 84 receives a stack of access tokens from token infrastructure 86, service providers 84 provide the stack of access tokens as a parameter to the rule check method of rule enforcement engine 82. The rule check method of rule enforcement engine 82 returns a value that indicates that the service provider is permitted to perform the requested action on the resource only when the accounts associated with the chambers indicated by each of the access tokens in the stack have the right to perform the requested action on the resource. For instance, if the stack of access tokens includes a first access token that indicates that account "A" is permitted to read and write to a file "F" and the stack of access tokens includes a second access token that indicates a chamber associated with account "B" is permitted to read to file "F", then the rule check method does not return a value that indicates that the requesting service provider can write to file "F".

After receiving value from the rule check method of rule enforcement engine 82, methods of service providers 84 may perform a variety of actions. For instance, when the rule check method returns a value indicating that software processes operating in a chamber associated with an account do not have the right to perform the requested action with regard to a resource, methods implemented by service providers 84 may return error messages. On the other hand, when the rule check method returns a value indicating that software processes operating in the chamber associated with the account have the right to perform the requested action with regard to the resource, the methods of service providers 84 may perform the requested action with regard to the resource.

In the example of FIG. 3, device 2 includes a client process 88 that operates in a chamber. Although not illustrated in the example of FIG. 3, device 2 may include a large number of client processes. One or more of the other client processes may operate in the same chamber as client process 88. Client process 88 may be a wide variety of software processes or software threads operating in kernel-mode or user-mode. Furthermore, client process 88 may be a part of operating system 18 or a part of one of software applications 16 (FIG. 1). For example, client process 88 may be a software process of a word processor application or a video game. In another example, client process 88 may be a software process of a malicious application, such as computer virus. To use a resource of device 2, client process 88 invokes a method implemented by one of service providers 84. When client process 88 invokes the method implemented by one of service providers 84, components of operating system 18 and security infrastructure 70 may perform various operations, such as the example operation provided below with regard to FIG. 4. Because service providers 84 are responsible for invoking the rule check method of rule enforcement engine 82, it is not necessary to trust client process 88 to check whether it has the right to perform an action with regard to a resource.

It should be understood that client process 88, when operated in different chambers associated with different accounts, may or may not be permitted to perform an action with regard to a resource. Accordingly, client process 88 should be coded such that client process 88 is able to gracefully handle situations in which client process 88 is not permitted to perform the action with regard to the resource.

Figure 4:
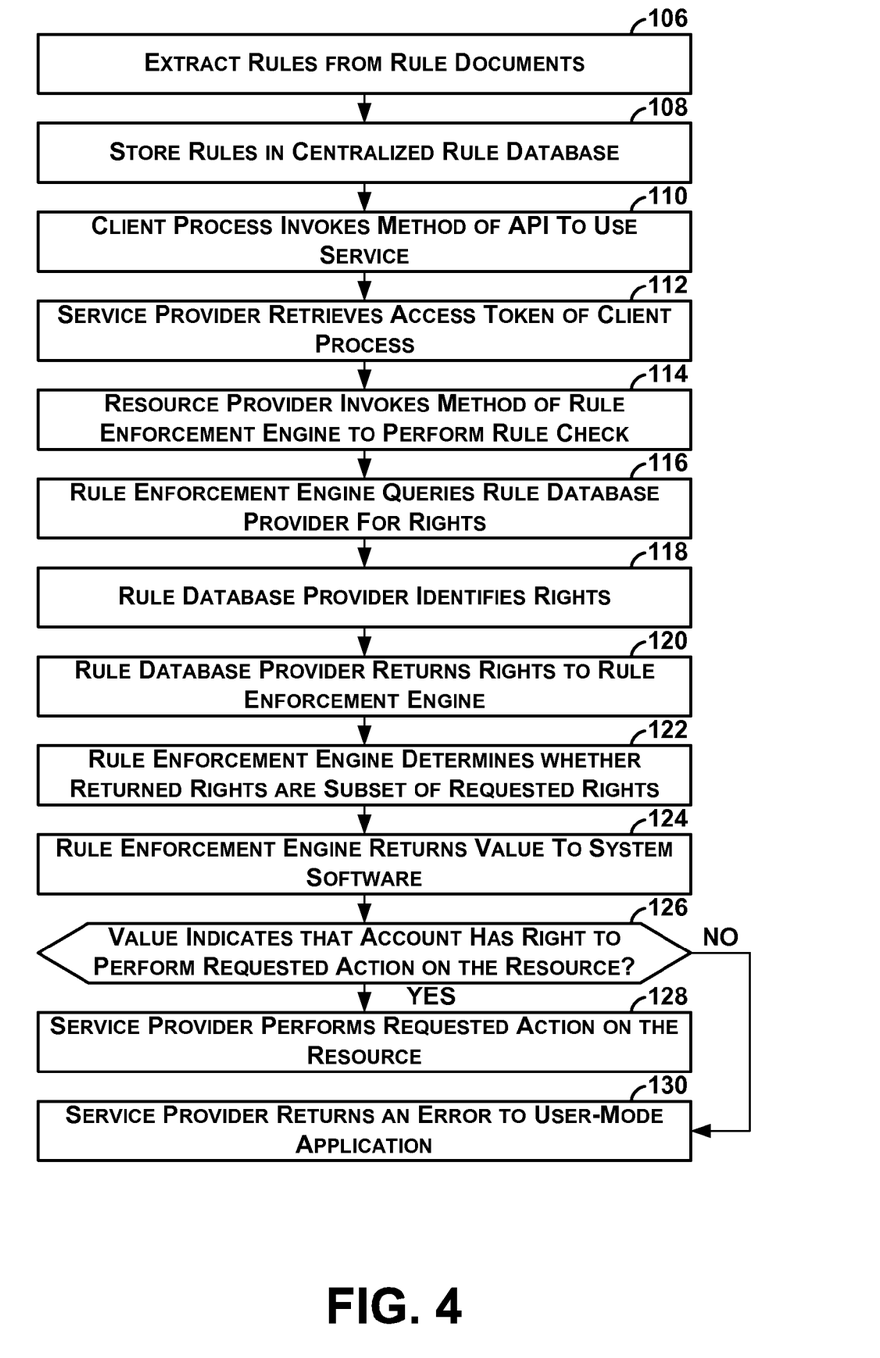
FIG. 4 is a flowchart illustrating an example operation of the software units illustrated in the example of FIG. 3.

FIG. 4 is a flowchart illustrating an example operation of the software units illustrated in the example of FIG. 3. It should be understood that the operation illustrated in the example of FIG. 4 is provided for explanatory purposes and is not intended to represent a sole possible operation of the software units.

As illustrated in the example of FIG. 4, rule loader 76 extracts rules in the set of rules from rule documents 74 (106). As discussed above, rule documents 74 contain at least one XML element that represents the each of the rules. After extracting the rules, rule loader 76 may store the extracted rules in centralized rule database 22 (108).

Subsequently, client process 88 invokes a method of a software interface implemented by a "target" service provider that is one of service providers 84 (110). When invoked, the method retrieves an access token associated with client process 88 from token infrastructure 86 (112).

Next, the method of the "target" service provider invokes a rule check method of rule enforcement engine 82 (114). When the method invokes the rule check method of rule enforcement engine 82, the method may provide the access token associated with client process 88 to rule enforcement engine 82 as a parameter of the rule check method. Furthermore, when the method invokes the rule check method of rule enforcement engine 82, the method may provide to rule enforcement engine 82 the canonical name of a resource as a "target resource" parameter. This resource may be referred to herein as a "target" resource. The method may also provide to rule enforcement engine 82 the type of action to be performed on the resource as a "requested rights" parameter.

After the rule check method is invoked, rule enforcement engine 82 invokes an access right query method of rule database provider 80 (116). Rule enforcement engine 82 may provide, as a parameter of the access right query method, a query that requests a list of rights that software processes operating in an account associated with the chamber identified by the access token of client process 88 have with regard to a resource identified by the canonical resource name. The list of rights specifies actions that the software processes operating in the chamber associated with the account are allowed to perform with regard to the resource. When invoked, the query method of rule database provider 80 uses centralized rule database 22 to generate the list of rights (118). An example operation to generate the list of rights is provided below with regard to FIG. 5. The query method of rule database provider 80 may then return the list of rights to the rule check method of rule enforcement engine 82 (120).

When the rule check method of rule enforcement engine 82 receives the list of rights, the rule check method determines whether the rights requested by the target service provider are a subset of the rights specified by the list of rights returned by rule database provider 80 (122). For instance, if the list of rights returned by the access right query method of rule database provider 80 does not specify any rights, the rule check method may determine that the set of rights requested by client process 88 is not a subset of the rights specified by the list of rights returned by rule database provider 88. After determining whether the rights requested by the "target" service provider are a subset of the rights specified by the list of rights returned by rule database provider 80, the rule check method may return, to the method of the "target" service provider, a value that indicates whether the account associated with the chamber in which client process 88 operates has the right to perform the action on the resource (124).

Once the method of the "target" service provider receives the value, the method of the service provider determines whether the value indicates that the account associated with the chamber associated with client process 88 has the right to perform the action on the "target" resource (126). If the method of the service provider determines that the value indicates that the account associated with the chamber associated with client process 88 has the right to perform the action on the "target" resource ("YES" of 126), the method of the "target" service provider performs the action on the "target" resource (128). On the other hand, if the method of the "target" service provider determines that the value indicates that the account associated with the chamber associated with client process 88 does not have the right to perform the action on the "target" resource ("NO" of 126), the method of the service provider may return an error message to client process 88 (130).

Figure 5:
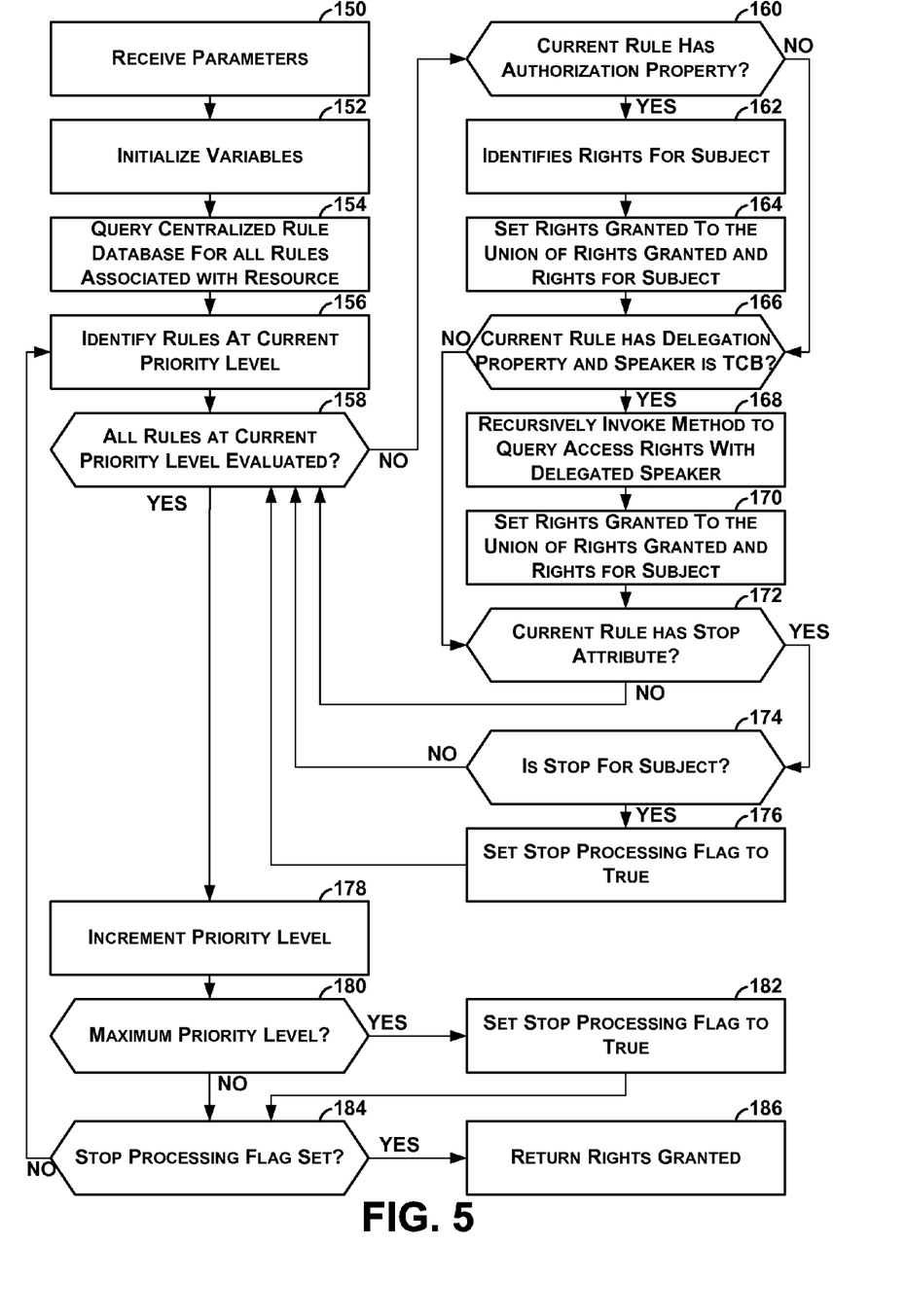
FIG. 5 is a flowchart illustrating an example operation of a rule database provider (FIG. 3) to identify rights of an account with regard to a resource.

FIG. 5 is a flowchart illustrating an example operation of rule database provider 80 to identify rights of an account with regard to a resource. It should be understood that the operation illustrated in the example of FIG. 5 is provided for explanatory purposes and is not intended to represent a sole possible operation of rule database provider 80.

As illustrated in the example of FIG. 5, the operation may begin when rule database provider 80 receives a "speaker" parameter, a "resource name" parameter, and a "subject" parameter (150). The "speaker" parameter indicates an account identifier of a speaker of a rule. The "resource name" parameter indicates a canonical name of a resource. The "subject" parameter indicates an account identifier associated with a chamber.

After receiving the parameters, rule database provider 80 initializes a "rights granted" variable, a "current priority" variable, and a "stop processing" flag (152). When initialized, the "rights granted" variable is a null value, the "current priority" variable is equal to the lowest priority, and the "stop processing" flag is equal to false.

Once rule database provider 80 has initialized the variables, rule database provider 80 may query centralized rule database 22 for rules that include a "speaker" attribute that specifies the account identifier indicated by the "speaker" parameter and that include a "resource name pattern" attribute that specifies a resource name pattern that described the canonical name specified by the "resource name" parameter (154). The rules returned by this query are referred to herein as the "matching rule set."

After rule database provider 80 receives the matching rule set, rule database provider 80 identifies the rules in the matching rule set that include "priority" attributes that specify a priority equal to the priority indicated by the "current priority" variable (156). The rules in the matching rule set that include "priority" attributes that specify a priority equal to the priority indicated by the "current priority" variable are referred to herein as the "current rule set."

Next, rule database provider 80 determines whether all rules in the current rule set have been evaluated (158). If not all rules in the current rule set have been evaluated ("NO" of 158), rule database provider 80 may determine whether an unevaluated rule in the current rule set (i.e., the "current rule") includes an "authorize" property (160).

If the current rule includes an "authorize" property ("YES" of 162), rule database provider 80 identifies rights granted by the current rule to the account identified by the account identifier specified by the "subject" parameter (164). For example, rule database provider 80 may identify "READ" and "WRITE" as rights granted by the current rule to the account identified by the account identifier specified by the "subject" parameter. After identifying the rights granted by the current rule to the account identified by the account identifier specified by the "subject" parameter, rule database provider 80 sets the "rights granted" variable to the union of the current value of the "rights granted" variable and the rights granted by the current rule to the account identified by the account identifier specified by the "subject" parameter (166).

After setting the "rights granted" variable or after determining that the current rule does not include an "authorized" property ("NO" of 162), rule database provider 80 may determine whether the current rule includes a "delegation" property and the "speaker" parameter indicates the trusted computing base (TCB) account (166). If rule database provider 80 determines that the current rule includes a "delegation" property and the "speaker" parameter indicates the TCB account ("YES" of 166), rule database provider 80 may recursively invoke the method of rule database provider 80 to identify rights of an account with regard to a resource (168). When rule database provider 80 invokes the method, rule database provider 80 may use the account identifier specified by the "speaker" attribute of the current rule as the "speaker" parameter of the method, the resource name specified by the "resource name" parameter as the "resource name" parameter of the method, and the "subject" parameter as the "subject" parameter of the method. After invoking the method, rule database provider 80 sets the "rights granted" variable to the union of the current value of the "rights granted" variable and the rights returned by the method (170).

After setting the "rights granted" variable or after determining that the current rule does not include a "delegation" property or the "speaker" parameter does not specify the TCB account ("NO" of 166), rule database provider 80 may determine whether the current rule includes a "stop" attribute (172). If the current rule includes a "stop" attribute ("YES" of 172), rule database provider 80 may determine whether the "stop" attribute is applicable to the account identified by the account identifier specified by the "subject" parameter (174). In one example implementation, the "stop" attribute is applicable to the account identified by the account identifier specified by the "subject" parameter when the "stop" attribute is an attribute of an "authorize" property or a "delegate" property that includes an "account identifier" attribute that specifies the account identifier. If the "stop" attribute is applicable to the account identified by the account identifier specified by the "subject" parameter ("YES" of 174), rule database provider 80 sets the "stop processing" flag equal to true (176).

After setting the "stop processing" flag, or after rule database provider 80 determines that the "stop" attribute is not applicable to the account identified by the account identifier specified by the "subject" parameter ("NO" of 174) or after rule database provider 80 determines that the current rule does not include a "stop" attribute ("NO" of 172), rule database provider 80 may loop back and again determine whether all of the rules in the current rule set have been evaluated (158), and so on.

If all of the rules in the current rule set have been evaluated ("YES" of 158), rule database provider 80 may increment the "current priority" variable (178). Next, rule database provider 80 may determine whether the "current priority" variable is equal to a maximum priority value (180). In one example implementation, the maximum priority value is the highest value specified by a "priority" attribute of any rule in the matching rule set. If the "current priority" variable is equal to the maximum priority value ("YES" of 180), rule database provider 80 may set the "stop processing" flag equal to true (182).

After setting the "stop processing" flag or after determining that the "current priority" variable is equal to the maximum priority value ("NO" of 180), rule database provider 80 may determine whether the "stop processing" flag is set to true (184). If the "stop processing" flag is set to true ("YES" of 184), rule database provider 80 may return the "rights granted" variable (186). On the other hand, if the "stop processing" flag is not set to true ("NO" of 184), rule database provider 80 may loop back and again identify rules in the matching rule set that include "priority" attributes that specify the value specified by the "current priority" variable (156), and so on.

Because of this operation, rule enforcement engine 82 determines that one of the rules in centralized rule database 22 grants to the subject account the right to perform the action on the target resource when one of the rules in the first set of rules is associated with a speaker attribute that identifies a TCB account and grants to the subject account the right to perform the action on the target resource. In addition, because of this operation, rule enforcement engine 82 determines that one of the rules in centralized rule database 22 grants to the subject account the right to perform the action on the target resource when one of the rules in the first set of rules is associated with a speaker attribute that identifies a given account and explicitly grants to the subject account the right to perform the action on the target resources and the second set of rules includes a chain of delegation rules that describes a delegation of rule-making authority from the TCB account to the given account.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   storing a set of rules in a centralized rule database, each rule specifying a set of actions that a subject account has a right to perform with regard to protected resources having canonical names described by a resource name pattern;
   associating each software process of a device with a chamber in a plurality of chambers, wherein none of the software processes are associated with more than one of the chambers, wherein each chamber in the plurality of chambers is associated with at least one of the software processes;
   providing a set of service providers that performs an action with regard to one of the protected resources in response to a request from one of the software processes when the centralized rule database includes a rule that grants to an account associated with the chamber associated with the software process a right to perform the action with regard to the one of the protected resources,
   wherein, for each of the software processes, the software process uses the service providers to perform actions on any of the protected resources that are not associated with the chamber associated with software process;
   receiving, with a target service provider that is one of the service providers, a request from a requesting software process that is one of the software processes; and
   performing, with the target service provider in response to the request, an action with regard to a target resource when the centralized rule database includes a rule that grants to a subject account a right to perform the action with regard to the target resource, wherein the target resource is one of the protected resources, and wherein the subject account is an account associated with the chamber associated with the requesting software process.

2. The method of claim 1, wherein no two ones of the protected resources have a common canonical name.

3. The method of claim 1,
   wherein the protected resources are classified into a plurality of types by system services that manage the protected resources; and
   wherein the canonical names of ones of the protected resources that are classified into different types belong to different hierarchical namespaces.

4. The method of claim 3, wherein the protected resources include at least one protected resource selected from a group of types of resources that consists of: files, registry keys, application programming interfaces, software processes, and software threads.

5. The method of claim 1, wherein the canonical names of the protected resources are Internationalized Resource Identifiers (IRIs).

6. The method of claim 1, wherein each rule in the set of rules specifies a set of access rights that a subject account is permitted to perform with regard to a given one of the protected resources in the set of protected resources by specifying a resource name pattern that describes the canonical name of the given protected resource.

7. The method of claim 6, wherein the resource name pattern describes the canonical names of multiples ones of the protected resources.

8. The method of claim 1, wherein the method further comprises:
   invoking, at the target service provider, a rule check method implemented by a rule enforcement engine;
   using the set of rules to determine, at the rule enforcement engine, whether the subject account has the right to perform the action with regard to the target resource; and
   providing to the target service provider a value that indicates whether the subject account has the right to perform the action with regard to the target resource; and
   performing, at the target service provider, the action with regard to the target resource when the value indicates that the subject account has the right to perform the action with regard to the target resource.

9. The method of claim 8, wherein the rule enforcement engine is part of a trusted computing base of a device.

10. The method of claim 8, wherein the target service provider is a system service provider.

11. The method of claim 8, wherein using the set of rules to determine, at the rule enforcement module, whether the subject account has the right to perform the action with regard to the target resource comprises:
   using the set of rules to identify actions that the subject account has the right to perform with regard to the target resource;
   determining that the subject account has the right to perform the action with regard to the target resource when the action is one of the identified actions; and
   determining that the subject account does not have the right to perform the action with regard to the target resource when the action is not one of the identified actions.

12. The method of claim 1,
   wherein the set of rules is a first set of rules;
   wherein each rule in the centralized rule database is associated with a speaker attribute that identifies an account that created the rule;
   wherein the method further comprises storing, in the centralized rule database, a second set of rules, each rule in the second set of rules specifying a first account that has a right to make rules that authorize at least one other account to perform a set of actions with regard to one of the protected resources; and
   wherein determining whether a rule in the set of rules grants to the account the right to perform an action with regard to the "object" resource comprises:
      determining, at the rule enforcement engine, that one of the rules in the centralized rule database grants to the subject account the right to perform the action on the target resource when one of the rules in the first set of rules is associated with a speaker attribute that identifies a trusted computing base (TCB) account and grants to the subject account the right to perform the action on the target resource; and
      determining, at the rule enforcement engine, that one of the rules in the centralized rule database grants to the subject account the right to perform the action on the target resource when one of the rules in the first set of rules is associated with a speaker attribute that identifies a given account and explicitly grants to the subject account the right to perform the action on the target resources and the second set of rules includes a chain of delegation rules that describes a delegation of rule-making authority from the TCB account to the given account.

13. The method of claim 1, wherein storing the set of rules in the centralized database comprises:
   extracting a given rule in the set of rules from a document that contains at least one extensible markup language (XML) element that represents the given rule; and
   after extracting the given rule, storing the given rule in the centralized database.

14. The method of claim 1, wherein a plurality of the client processes operate in one of the chambers.

15. A device comprising:
   a processor; and
   one or more data storage media that store a centralized rule database and instructions,
      the centralized rule database storing a set of rules, the device having a plurality of protected resources, the protected resources associated with distinct canonical names, each rule specifying a set of actions that a subject account has a right to perform with regard to ones of the protected resources having canonical names described by a resource name pattern;
   execution of the instructions by the processor causing the device to execute a set of software processes, the set of software processes including each software process of the device, wherein each of the software processes is associated with a chamber in a plurality of chambers and each of the chambers is associated with at least one of the software processes, and
   execution of the instructions by the processor further causing the device to provide a security infrastructure that, for any given software process in the set of software processes, prevents the given software process from directly or indirectly performing an action on any of the protected resources that are outside the chamber associated with the given software process, except when one of the rules in the centralized rule database grants to a subject account a right to perform the action on a target resource,
      wherein the target resource is one of the protected resources that is not associated with the chamber associated with the given software process, and
      wherein the subject account is an account associated with the chamber associated with the given software process.

16. The device of claim 15,
   wherein execution of the instructions by the processor causes the device to determine whether one of the rules in the centralized rule database grants to the subject account the right to perform the action on the target resource; and
   wherein execution of the instructions by the processor causes the device to perform the action on the target resource in response to an invocation of a method by one of the software processes, the device performing the action after determining that the subject account has the right to perform the action on the target resource, but not after determining that the subject account does not have the right to perform the action on the target resource.

17. The device of claim 16, wherein execution of the instructions by the processor causes the device to provide an operating system that includes the security infrastructure, the operating system performing the action on the target resource in response to the invocation of the method by the one of the software processes.

18. The device of claim 16, wherein execution of the instructions by the processor causes the device to:
   extract the rules from a document that contains extensible markup language (XML) elements that represent the rules; and load the rules and into the centralized rule database.

19. The device of claim 16,
   wherein the set of rules is a first set of rules;
   wherein each rule in the centralized rule database is associated with a speaker attribute that identifies an account that created the rule;
   wherein the centralized rule database stores a second set of rules, each rule in the second set of rules specifying a delegate account that has a right to make rules that authorize an account to perform a set of actions with regard to ones of the protected resources; and
   wherein execution of the instructions by the processor causes the device to:
      determine that one of the rules in the centralized rule database grants to the subject account the right to perform the action on the target resource when one of the rules in the first set of rules is associated with a speaker attribute that identifies a trusted computing base (TCB) account and grants to the subject account the right to perform the action on the target resource; and determine that one of the rules in the centralized rule database grants to the subject account the right to perform the action on the target resource when one of the rules in the first set of rules is associated with a speaker attribute that identifies a given account and explicitly grants to the subject account the right to perform the action on the target resources and the second set of rules includes a chain of delegation rules that describes a delegation of rule-making authority from the TCB account to the given account.

20. A data storage medium comprising a device or article of manufacture that stores computer-readable instructions, execution of the computer-readable instructions by a device causing the device to:

extract a set of rules from a document that contains extensible markup language (XML) elements, one or more of which represents one of the rules;
wherein each of the rules includes:
  1) a resource name attribute that specifies a resource name pattern that describes Internationalized Resource Identifiers (IRIs) that identify protected resources of the device;
  2) a speaker attribute that specifies an account identifier that identifies an account associated with a process that created the rule; and
  3) a priority attribute that specifies a priority of the rule;
wherein a first subset of the rules also include an authorize property that includes one or more match attributes, wherein each match attribute of a rule in the first subset of the rules includes:
  1) an account identifier attribute that specifies an account identifier; and
  2) an action attribute that specifies a set of actions;
wherein a second subset of the rules also includes a delegation property that includes one or more delegation match attributes, wherein each match attribute of a rule in the first subset of the rules includes:
  1) a delegate account identifier attribute that specifies an account identifier; and
  2) a delegation action attribute that specifies a set of actions;
store the set of rules in a centralized database;
generate, for each software process of the device, an access token that specifies a chamber in a plurality of chambers, wherein none of the software processes are associated with more than one of the chambers, wherein each chamber in the plurality of chambers is associated with at least one of the software processes;
provide a set of service providers that only perform an action with regard to one of the protected resources in response to a request from one of the software processes when the centralized rule database includes a rule that grants to an account associated with the chamber associated with the software process a right to perform the action with regard to the one of the protected resources, wherein, for each of the software processes, the software process must use the service providers to perform actions on any of the protected resources that are not associated with the software process;

invoke, with a requesting process that is one of the software processes, a method of a software interface implemented by a target service provider that is one of the service providers;

invoke, with the method of the target service provider after the method of the target service provider is invoked, a rule check method implemented by a rule enforcement engine that is part of a trusted computing base of the device, specifying a canonical resource name of a target resource that is one of the protected resources as a resource name parameter of the rule check method, specifying the access token for the requesting process as a subject parameter of the rule check method, and specifying a set of at least one right as a "rights requested" parameter of the rule check method;

invoke, with the rule check method after the rule check method is invoked, a query method implemented by a database service provider that is part of the trusted computing base of the device, specifying a trusted computing base account as a speaker parameter of the query method, specifying the resource name specified by the resource name parameter of the rule check method as a resource name parameter of the query method, and specifying the access token specified by the subject parameter of the rule check method as a subject parameter of the query method;

initialize, with the query method when the query method is invoked, a priority variable to indicate a lowest priority, a rights granted variable to an empty set of rights, a stop processing flag to false;

identify, with the query method after the priority variable is initialized, a matching rule set that includes all rules in the centralized database that include a speaker attribute that specifies the trusted computing base account and that include a resource name attribute that specifies a resource name pattern that describes the resource name specified by the resource name parameter of the query method;

(1) identify, with the query method after identifying the matching rule set, a current rule set that includes all rules in the matching rule set that include a priority attribute that specifies a priority equal to a priority specified by the priority variable;

(2) for each of the rules in the current rule set:
  determine whether the rule in the current rule set includes an authorization property;
  set the rights granted variable equal to a union of rights previously specified by the rights granted variable and a set of rights specified by the action attribute of the rule in the current rule set;
  determine whether the rule in the current rule set includes a delegation property and whether the speaker parameter specifies an account identifier of a trusted computing base account of the device;
  recursively invoke, when it is determined that the rule in the current rule set includes a delegation property and that the speaker parameter specifies the account identifier of the trusted computing base account of the device, the query method of the database service provider, providing the account identifier specified by the speaker attribute of the rule in the current rule set as a speaker parameter of the recursively invoked query method, providing the resource name of resource name parameter of the query method as a resource name parameter of the recursively invoked query method, and providing the access token specified by the subject parameter of the query method as a subject parameter of the recursively invoked query method;

receive, in response to recursively invoking the query method, a set of rights;

set the rights granted variable equal to a union of rights previously specified by the rights granted variable and the set of rights received in response to recursively invoking the query method;

determine whether the rule in the current set of rules includes a stop attribute;

determine, when it is determined that the rule in the current set of rules includes the stop attribute, whether the stop attribute is applicable to the account associated with the chamber specified by the access token specified by the subject parameter;

set, when it is determined that the stop attribute is applicable to the account associated with the chamber specified by the access token specified by the subject parameter, the stop processing flag to true;

(3) increment, after processing each rule in the current rule set, the priority variable;

(4) determine, after the priority variable is incremented, whether the priority variable exceeds a maximum priority level;

(5) set, when it is determined that the priority variable exceeds the maximum priority level, the stop processing flag to true;

(6) determine, when it is determined that the priority variable exceeds the maximum priority level or after the stop processing flag is set to true, whether the stop processing flag is set to true;

(7) return, when it is determined that the stop processing flag is set to true, the rights granted variable;

(8) repeat, when it is determined that the stop processing flag is not set to true, actions 1-8;

determine, at the rule check method when the rule check method receives the rights granted variable from the query method, whether the rights granted variable indicates a set of rights that are a subset of the rights specified by the rights requested parameter of the rule check method;

return to the method of the target service provider a value,
wherein the value indicates that the account associated with the chamber specified by the access token of the requesting process has a right to perform the action specified by the rights requested parameter of the rule check method when the rights granted variable indicates a set of rights that are a subset of the rights specified by the rights requested parameter of the rule check method; and wherein the value indicates that the account associated with the chamber specified by the access token of the requesting process does not have a right to perform the action specified by the rights requested parameter of the rule check method when the rights granted variable indicates a set of rights that are not a subset of the rights specified by the rights requested parameter of the rule check method;

determine, at the method of the target service provider, whether the value indicates that the account associated with the chamber specified by the access token of the requesting process has a right to perform the action specified by the rights requested parameter of the rule check method;

perform, at the method of the target service provider when it is determined that the value indicates that the account associated with the chamber specified by the access token of the requesting process has a right to perform the action specified by the rights requested parameter of the rule check method, the action on the resource; and return, at the method of the service provider when it is determined that the value indicates that the account associated with the chamber specified by the access token of the requesting process does not have a right to perform the action specified by the rights requested parameter of the rule check method, an error to the client process.

* * * * *